United States Patent [19]

Touba

[11] 3,843,816

[45] *Oct. 22, 1974

[54] TEXTURIZING OF PROTEIN

[75] Inventor: Ali R. Touba, Minneapolis, Minn.

[73] Assignee: General Mills, Inc., Minneapolis, Minn.

[ * ] Notice: The portion of the term of this patent subsequent to Mar. 21, 1989, has been disclaimed.

[22] Filed: Oct. 19, 1971

[21] Appl. No.: 190,637

[52] U.S. Cl............... 426/388, 426/364, 426/447, 426/802
[51] Int. Cl. ............................................. A23j 1/14
[58] Field of Search ............... 99/14, 18, 17, 82, 83, 99/90 HP, 80, 98

[56] References Cited
UNITED STATES PATENTS

| | | |
|---|---|---|
| 2,162,729 | 6/1939 | Levinson................................... 99/2 |
| 3,488,770 | 1/1970 | Atkinson................................. 99/17 |
| 3,637,400 | 1/1972 | Mullen et al........................ 99/98 X |
| 3,650,763 | 3/1972 | Touba................................. 99/98 X |

*Primary Examiner*—A. Louis Monacell
*Assistant Examiner*—R. B. Penland
*Attorney, Agent, or Firm*—Anthony A. Juettner; Gene O. Enockson

[57] ABSTRACT

A method is disclosed for producing a bland textured protein product. A protein concentrate or isolate is texturized between a pair of heated surfaces which exert a compressive force on the protein material. The protein material is expanded upon release of the compressive force.

10 Claims, No Drawings

TEXTURIZING OF PROTEIN

The present invention relates to food processing and more particularly to a method of texturizing and expanding protein material.

In recent years substantial effort has been directed toward treating untextured protein materials including vegetable protein material so as to provide such materials with texture and other characteristics commonly found in animal meat products. The vegetable protein materials are primarily soybean meal or flour; however, various other vegetable protein meals and flours may be used, typically, such materials as peanut, cottonseed, sesame seed and brewer flakes. Other protein materials that have been used include casein and whey. In the present invention the protein material is a concentrate or isolate of such materials including at least about 50% protein by weight.

Various types of methods and apparatus have been used in the past to texturize the vegetable protein material. For example, solubilized soy protein has been extruded into an acid bath thereby precipitating the protein and forming texturized fibers. Recently it was discovered that protein material may be texturized by propelling masses of closely spaced particulate protein material in a confined path through an area having an elevated gaseous pressure and then removing the masses to a zone of lower gaseous pressure.

The present invention relates to a method of texturizing protein material between a pair of heated surfaces which exert compressive force on the protein material. The protein material then expands upon release of the compressive force. As used herein the term "texturized" and the like menas that the protein material has a resistance to bite similar to that found in meat. Texturization takes place when the discrete portions of protein in the material fuse to form continuous phase protein.

The apparatus used to carry out the present invention may be of any suitable type that will provide a pair of heated, substantially parallel surfaces that are capable of exerting the necessary compressive force. One preferred type of apparatus is a hydraulic press equipped with a pair of heated platens. Other types of apparatus may be used. For example, the pair of heated surfaces may be provided by a pair of cooperating belts and the compressive force may be provided by forcing the adjacent reaches of belts toward one another such as with a pneumatic spring which exerts the desired amount of force. Alternatively, the spacing between the adjacent reaches of the belts may provide the compressive force. In other words the spacing may be fixed and the amount of protein material passing between the reaches is great enough to result in compressive force.

The apparatus used to carry out the texturizing methods described in the following Examples I and II was a 12 ton Carver Laboratory Press equipped with a pair of heated platens. The Carver Press was hydraulically driven. Each platen was a steel plate approximately 6 inches by 6 inches by 1 inch. The platens were aligned one above the other with one of the plates being vertically moveable and the other plate being stationary. The platens or plates were electrically heated and had a total power input of about 1,140 watts. The apparatus included a thermostat which controlled the temperature of the plates and further included a dial gauge for measuring the pressure exerted between the plates. Provision is made for controlling the extent to which the protein material was compressed. Typically, a metal spacer of the desired thickness may be placed between the plates.

In one preferred embodiment of the present invention a closed system is used in which both mechanical and gaseous pressure is applied to the protein material. The gaseous pressure is provided by vaporization of the moisture in the protein material, the moisture being entrapped by a continuous spacer. In Examples I and II the continuous spacer was prepared from a sheet of steel 6 inches by 6 inches by 1/32 inch. A center portion of the sheet was removed to provide an opening of 4½ inches by 4½ inches. Thus, when the space, is placed between the plates and the plates are driven together, a closed chamber 4½ inches by 4½ inches by 1/32 inch is formed. Texturization takes place in this chamber.

The press used in Examples III–IX was a commercial sized press including a pair of heated plates. One of the plates was stationary and the other plate was hydraulically driven. The plates were each 20 inches by 20 inches by 1.9 inches. The hydraulic apparatus was set to apply a force of 730 p.s.i.g. on the protein material. A spacer was provided from a steel sheet which was 20 inches by 20 inches by 1/32 inch. A center portion 18 inches by 18 inches was removed from the steel sheet. The spacer was used in Examples III, IV, VI, VIII and IX. The plates were electrically heated and the total possible electrical power input was about 25,000 watts. The apparatus also included a thermostat for controlling the temperature of the plates.

The protein material used in the present invention may be any untextured protein material in which the protein content is at least 50% on a dry weight basis (as used herein percentages and parts will be by weight unless otherwise indicated). The protein material, of course, must not be so denatured that it is no longer reactive. The protein material may be a concentrate or isolate of soybean, peanut, cottonseed, sesame seed, rapeseed, chick peas, casein, whey and the like.

The protein material has sufficient moisture present to provide the desired degree of expansion upon release of the compressive force. The protein material does not have so much moisture as to make the material difficult to handle. In other words the protein material preferably should remain as a flowable particulate material. The protein material has a moisture content of at least about 10% by weight at the time the material is placed between the heated surfaces. The protein material generally has a moisture content of between 15% and 25%, and rarely, if ever, above 35%.

The preferred amount of moisture present is at least equal to the equation $\%H_2O = 24 - 0.09\,(T-350)$ wherein $\%H_2O$ means the percent of water in the protein material at the time the material is placed between the heated surfaces and pressure is applied and wherein T is the temperature of the heated surfaces, said temperature being between 350° and 500°F. The protein material may include various other added materials such as flavorings.

The temperature of the heated surfaces is sufficient to produce a relatively uniform expansion or puffing of the protein material. The temperature of the heated surfaces is below that at which the protein material will toast, scorch or burn during the processing of the present invention. The temperature is also below that at which the protein material will expand so rapidly as to explode and blow a substantial amount of material out from between the heated surfaces. During processing according to the present invention, the temperature of the heated surfaces will be at least 350°F., generally about 450° to 500°F., and rarely, if ever, above 550°F.

The pressure exerted by the heated surfaces on the protein material is sufficient to provide good physical heat transmitting contact between the heated surfaces and the protein material. The force is also sufficient to entrap enough of the steam formed within the protein material to provide the desired degree of expansion upon release of the compressive force. The greater the force and the greater the amount of moisture present, the greater will be the degree of expansion. The pressure exerted by the heated surfaces will typically be between 50 and 1,000 pounds per square inch gauge (p.s.i.g.).

The heat and compression is applied to the protein material for a time sufficient to provide texturization and expansion upon release of the compression. The heating and compression step will typically be for about 1 to 10 seconds. However, satisfactory texturization and expansion has been obtained using a time as short as 0.2 second and as long as 30 seconds. The processing time will generally be less than 1 minute. In any event, the processing time will not be so long as to toast, scorch or burn the protein material.

The texturized product of the present invention, upon removal from between the heated surfaces, is an expanded sheet. The expanded texturized protein material of the present invention preferably has a density of 0.08 to 0.3 gram per cubic centimeter; whereas, the compressed protein material absent expansion has a typical density of 0.5 to 0.8 gram per cubic centimeter. The sheet may be used for a high protein food product as is. Usually the sheet will be further treated such as by impregnation with flavoring.

Simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 part salt, 50 parts water, 24 parts of the texturized product which is ground or crumbled. Beef flavoring and sufficient caramel coloring is added to obtain the desired taste and coloring of cooked hamburger. The mixture may be heated to set the egg albumin. A high protein snack may be prepared by coating the expanded sheet with flavoring such as melted milk chocolate.

The following examples are illustrative of the present invention and are not intended to be limiting.

EXAMPLE I

Texturized protein was prepared according to the present invention by mixing 51 parts soy protein isolate (Promine R[1]), 119 parts soy protein concentrate (Textrol[2]) and 30 parts water. The materials were mixed in a Hobart mixer at speed No. 2 for about 5 minutes. The total moisture content of the mixture was about 17%. The resulting mixture was granular and was passed through a number 12 sieve. Seven grams were placed in aluminum foil and texturized between the heated plates of the Carver Press. The plates were at a temperature of 450°F. The previously described continuous spacer having a thickness of 1/32 inch was placed between the plates to control the minimum spacing. The force exerted by the press was 10,000 pounds. The resulting product was texturized and expanded. The product was hydrated by soaking in an excess of water for one-half hour. The hydrated product was passed through a meat grinder and used as a meat extender. The ground textured protein was mixed with ground beef in a 3 to 5 ratio. The mixture was formed into a patty and fried.

[1] Promine R is an isolated soy protein material having a protein content of about 95% (moisture as is) and produced by Central Soya Co., Inc.

[2] Textrol is a processed soy protein material having a minimum protein content of 63.5% (moisture as is) and produced by Central Soya Co., Inc.

EXAMPLE II

Texturized protein was prepared according to the present invention substantially as described in Example I except that the mixture included 76.5 parts soy concentrate (Nutrisoy[3]), 76.5 parts of another soy concentrate (Gunther 31-49[4]), 17 parts soy isolate (Supro 610[5]) and 30 parts water. The total moisture content of the mixture was about 18%. Similar results were obtained.

[3] Nutrisoy is a defatted low heat soy flour having a protein content of about 50% (moisture as is) and is produced by Archer Daniels Midland Co.

[4] Gunther Soy Protein Concentrate 31-49 is a solvent wash soy concentrate having a protein content of about 67% (moisture as is).

[5] Supro 610 is an isolated soy protein material having a protein content of about 95% (moisture as is) and produced by Ralston Purina Co.

EXAMPLE III

Texturized protein was prepared according to the present invention by thoroughly mixing 30 parts soy protein isolate (Promine R), 70 parts soy protein concentrate (Textrol) and 25 parts water. The resulting moisture content was about 24% by weight. Ninety grams of the mixture were placed in the aforedescribed commercial-sized texturizing apparatus including a continuous spacer. The temperature of the plates was about 400°F. A total force of about 730 p.s.i.g. was applied to the mixture for about 1.5 seconds. Upon release of the pressure the product was found to be evenly expanded and texturized. The density of the product was 0.148 grams per cubic centimeter.

EXAMPLE IV

Example III was substantially repeated except water was not added. Thus the mixture of isolate and concentrate contained only about 5% water by weight. Upon release of the pressure, the product was found to be an unexpanded film having a few large bubbles. The density of the product was about 0.66 gram per cubic centimeter. Thus the addition of water was found to be necessary for production of the present invention, namely, the evenly expanded and texturized protein.

EXAMPLE V

Example IV was repeated except that the spacer was not used. Substantially the same type of product was obtained, namely, an unexpanded film.

EXAMPLE VI

Example III was repeated except the 25 parts water was reduced to 13 parts water, thus providing a total moisture content of about 14.5%. The temperature of the plates were raised to about 450°F. The spacer was used. The product upon release of the pressure was found to be evenly expanded and textured. The density of the product was about 0.126 gram per cubic centimeter.

EXAMPLE VII

Example VI was repeated except the spacer was not used. Substantially the same product was obtained except that the product was somewhat thinner. The density of the product was about 0.136 grams per cubic centimeter.

EXAMPLE VIII

Example VI was repeated except the water was added in an amount of 18 parts. An excellent product was obtained which was very bland. The density of the product was about 0.099 gram per cubic centimeter.

EXAMPLE IX

Example III was repeated except that the temperature of the plates was about 550°F. and the protein material was heat treated for only about 0.75 second. Acceptable product was obtained; however, the product quality was substantially less than that of Example III.

The embodiments of the invention in which an exclusive property or priviledge is claimed are defined as follows:

1. A method for texturizing protein comprising compressing and heating untextured protein material between a pair of parallel opposing heated surfaces for a period of time up to 1 minute, said material having a protein content of at least 50% dry weight basis, said material having a moisture content of between about 15% and 35% by weight, said heated surfaces being at a temperature and applying a pressure sufficient to cause said protein to texturize and sufficient to rapidly superheat said moisture, said temperature being between 350° and 550° F., said pressure being in the range of 50 to 1,000 p.s.i.g., the force of said compression being sufficient to entrap at least a portion of said superheated moisture, and rapidly releasing said compression thereby vaporizing said superheated moisture and expanding the texturized protein.

2. The method of claim 1 wherein said temperature is between 450° and 500°F.

3. The method of claim 1 wherein the density of the expanded, texturized protein is between about 0.08 and 0.3 gram per cubic centimeter.

4. The method of claim 1 wherein the moisture content is between 18 and 25% by weight.

5. The method of claim 4 wherein the protein material is a vegetable protein material.

6. The method of claim 5 wherein the protein material is a member of the group consisting of peanut, rapeseed, chick pea, soybean, cottonseed and sesame seed flour.

7. The method of claim 6 wherein the protein material is a mixture of soybean concentrate and isolate.

8. The method of claim 1 wherein said process is carried out in a closed system and gaseous pressure is provided by vaporization of the water.

9. The method of claim 8 wherein the closed system is provided by a continuous spacer disposed between said opposing heated surfaces.

10. The method of claim 1 wherein the percent moisture content of untextured protein material is equal to at least $24 - 0.09(T-350)$ and T is equal to the temperature of the heated surfaces, said temperature being between about 350° and 500°F.

* * * * *